United States Patent
Wu et al.

(10) Patent No.: US 10,620,594 B2
(45) Date of Patent: Apr. 14, 2020

(54) DISPATCH METHOD AND APPARATUS FOR COMBINED HEAT AND POWER SYSTEM

(71) Applicant: Tsinghua University, Beijing (CN)

(72) Inventors: Wenchuan Wu, Beijing (CN); Boming Zhang, Beijing (CN); Hongbin Sun, Beijing (CN); Chenhui Lin, Beijing (CN); Qinglai Guo, Beijing (CN); Bin Wang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 190 days.

(21) Appl. No.: 15/736,576

(22) PCT Filed: Dec. 1, 2017

(86) PCT No.: PCT/CN2017/114317
§ 371 (c)(1),
(2) Date: Dec. 14, 2017

(87) PCT Pub. No.: WO2018/153138
PCT Pub. Date: Aug. 30, 2018

(65) Prior Publication Data
US 2018/0356774 A1  Dec. 13, 2018

(30) Foreign Application Priority Data

Feb. 22, 2017  (CN) .......................... 2017 1 0097510

(51) Int. Cl.
*G01M 1/38* (2006.01)
*G05B 13/00* (2006.01)
(Continued)

(52) U.S. Cl.
CPC ....... *G05B 13/042* (2013.01); *F24D 19/1009* (2013.01); *F24D 19/1048* (2013.01);
(Continued)

(58) Field of Classification Search
CPC .............. H02J 3/46; Y02P 80/15; Y02E 40/76
(Continued)

(56) References Cited

U.S. PATENT DOCUMENTS

| 2009/0062969 A1* | 3/2009 | Chandra | G06Q 10/06 700/291 |
| 2014/0121848 A1* | 5/2014 | Long | F03D 9/00 700/291 |

(Continued)

FOREIGN PATENT DOCUMENTS

| CN | 102410594 | 4/2012 |
| CN | 102510099 | 6/2012 |

(Continued)

OTHER PUBLICATIONS

Wu, Economic dispatch with CHP and wind power, AIP journal V-9 Feb. 14, 2017 (Year: 2017).*

(Continued)

*Primary Examiner* — Md Azad
(74) *Attorney, Agent, or Firm* — Hodgson Russ LLP

(57) ABSTRACT

The present disclosure provides a dispatch method and apparatus for controlling a combined heat and power CHP system. The CHP system includes CHP units, non-CHP thermal units, wind farms and heating boilers; the CHP units, the non-CHP thermal units and the wind farms form an electric power system EPS of the CHP system; the CHP units and the heating boilers form a central heating system CHS of the CHP system; and the EPS and the CHS are isolable. The method includes: establishing a combined heat and power dispatch CHPD model, an objective function being a minimizing function of a total generation cost of the CHP units, the non-CHP thermal units, the wind farms and the heating boilers; solving the CHPD model based on Benders decomposition to obtain dispatch parameters for the EPS and the CHS; and controlling the EPS and the CHS (Continued)

electric power system      central heating system according to the corresponding dispatch parameters respectively.

18 Claims, 2 Drawing Sheets

(51) Int. Cl.
    *G05B 15/00*     (2006.01)
    *G05D 23/00*     (2006.01)
    *G05B 13/04*     (2006.01)
    *F24D 19/10*     (2006.01)
    *H02J 3/46*     (2006.01)
    *H02J 3/38*     (2006.01)

(52) U.S. Cl.
    CPC ............... *H02J 3/386* (2013.01); *H02J 3/46* (2013.01); *H02J 2203/20* (2020.01); *Y02E 40/76* (2013.01); *Y02P 80/15* (2015.11); *Y04S 10/545* (2013.01)

(58) Field of Classification Search
    USPC ........................................................ 700/276
    See application file for complete search history.

(56) References Cited

U.S. PATENT DOCUMENTS

| | | | |
|---|---|---|---|
| 2017/0117716 A1* | 4/2017 | Wolter | H02J 3/005 |
| 2017/0308968 A1* | 10/2017 | Zhou | G06Q 50/06 |
| 2017/0317499 A1* | 11/2017 | Tang | G06Q 10/04 |

FOREIGN PATENT DOCUMENTS

| | | |
|---|---|---|
| CN | 103728653 | 4/2014 |
| CN | 106294961 | 1/2017 |
| CN | 106339772 | 1/2017 |
| CN | 106815661 | 6/2017 |
| CN | 106992555 | 7/2017 |
| EP | 2779040 | 9/2014 |

OTHER PUBLICATIONS

English translation of the ISR/WO for PCT Application CN2017114317, dated Feb. 26, 2018.

* cited by examiner

DISPATCH METHOD AND APPARATUS FOR COMBINED HEAT AND POWER SYSTEM

CROSS-REFERENCE TO RELATED APPLICATION

This application is a U.S. national phase application of International Application No. PCT/CN2017/114317, filed on Dec. 1, 2017, which claims priority to and benefits of Chinese Patent Application No. 201710097510.9, filed with the State Intellectual Property Office of P. R. China on Feb. 22, 2017, the entire contents of which are incorporated herein by reference.

FIELD

The present disclosure relates to the power system operation technology field, and more particularly, to a dispatch method and a dispatch apparatus for a combined heat and power system.

BACKGROUND

A combined heat and power (CHP for short) system may include electric power systems (EPSs for short) and central heating systems (CHSs for short). For example, the CHP system may include CHP units, non-CHP thermal units, wind farms and heating boilers. The CHP units are configured to generate electricity for the EPSs and useful heat for the CHSs at the same time. However, utilization of wind power in the CHP system has encountered a critical problem in winter. For example, the wind resources are abundant but the electricity load is insufficient. More seriously, a significant conflict exists between the CHSs and wind power utilization. CHSs are supplied by the CHP units, and the generation output of a CHP unit is determined solely by the heat load demand A typical daily residential heat load curve peak occurs at nighttime, which is exactly when the daily curve of wind power peaks. Due to heating supply priority, CHP units must generate a large amount of electricity overnight, and thus wind power generation must be restricted. This conflict between the central heating supply and wind power utilization exists in urban areas with CHSs all over the world.

SUMMARY

Embodiments of the present disclosure provide a dispatch method for controlling a combined heat and power (CHP for short) system. The CHP system includes CHP units, non-CHP thermal units, wind farms and heating boilers; the CHP units, the non-CHP thermal units and the wind farms form an electric power system (EPS for short) of the CHP system; the CHP units and the heating boilers form a central heating system (CHS for short) of the CHP system; and the EPS and the CHS are isolable. The method includes: establishing a combined heat and power dispatch (CHPD for short) model of the CHP system, in which an objective function of the CHPD model is a minimizing function of a total generation cost of the CHP units, the non-CHP thermal units, the wind farms and the heating boilers and constraints of the CHPD model are established based on generation cost of the CHP units, the non-CHP thermal units, the wind farms and the heating boilers; solving the CHPD model based on Benders decomposition to obtain dispatch parameters for the EPS and the CHS; and controlling the EPS and the CHS according to the corresponding dispatch parameters respectively.

Embodiments of the present disclosure provide a dispatch device for controlling a CHP system. The CHP system includes CHP units, non-CHP thermal units, wind farms and heating boilers; the CHP units, the non-CHP thermal units and the wind farms form an EPS of the CHP system; the CHP units and the heating boilers form a CHS of the CHP system; and the EPS and the CHS are isolable. The device includes a processor; and a memory for storing instructions executable by the processor, in which the processor is configured to perform the above dispatch method for controlling a CHP system.

Embodiments of the present disclosure provide a non-transitory computer-readable storage medium having stored therein instructions that, when executed by a processor of a computer, causes the computer to perform the above dispatch method for controlling a CHP system.

It is to be understood that both the foregoing general description and the following detailed description are exemplary and explanatory only and are not restrictive of the invention, as claimed.

BRIEF DESCRIPTION OF THE DRAWINGS

In order to explicitly illustrate embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labor.

DETAILED DESCRIPTION

In order to make objectives, technical solutions and advantages of the present disclosure clearer, in the following the present disclosure will be described in detail with reference to drawings. Apparently, the described embodiments are only some embodiments of the present disclosure and do not represent all the embodiments. Based on the embodiment described herein, all the other embodiments obtained by those skilled in the art without creative labor belong to the protection scope of the present disclosure.

Figure 1:
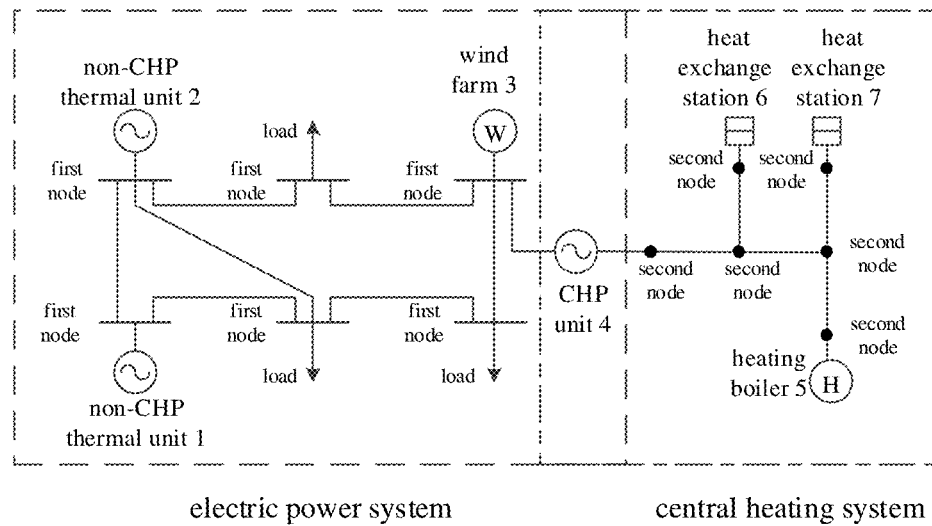
FIG. 1 is a schematic diagram of a combined heat and power (CHP) system according to an exemplary embodiment.

FIG. 1 is a schematic diagram of a combined heat and power (CHP for short) system according to an exemplary embodiment. As illustrated in FIG. 1, the CHP system includes a non-CHP thermal unit1, a non-CHP thermal unit 2, a wind farm 3, a CHP unit 4, and a heating boiler 5. The non-CHP thermal unit1, the non-CHP thermal unit 2, the wind farm 3 and the CHP unit 4 form an electric power system (EPS for short) of the CHP system. The CHP unit 4 and the heating boiler 5 form a central heating system (CHS for short) of the CHP system. The EPS and the CHS are isolable. In addition, FIG. 1 also illustrates loads and first nodes in the EPS, and second nodes and heat exchange stations in the CHS.

Figure 2:
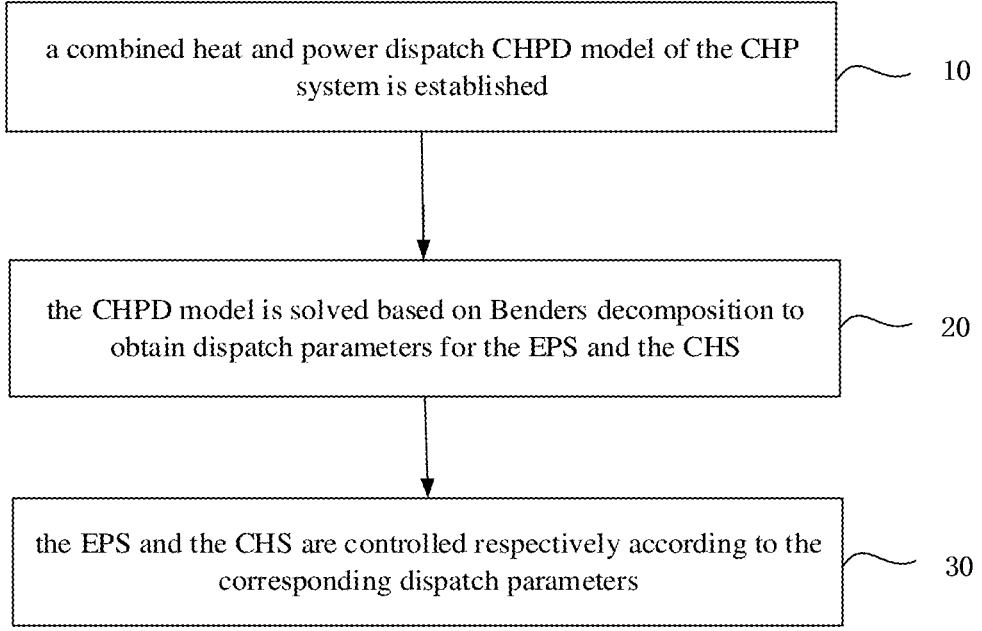
FIG. 2 is a flow chart of a dispatch method for a CHP system according to an exemplary embodiment.

FIG. 2 is a flow chart of a dispatch method for a CHP system according to an exemplary embodiment. As illustrated in FIG. 2, the method includes followings.

At block 10, a combined heat and power dispatch (CHPD for short) model of the CHP system is established. An objective function of the CHPD model is a minimizing function of a total generation cost of the CHP units, the non-CHP thermal units, the wind farms and the heating boilers and constraints of the CHPD model are established based on generation cost of the CHP units, the non-CHP thermal units, the wind farms and the heating boilers.

At block 20, the CHPD model is solved based on Benders decomposition to obtain dispatch parameters for the EPS and the CHS.

At block 30, the EPS and the CHS are controlled respectively according to the corresponding dispatch parameters.

In the following, the dispatch method will be described in detail.

(1) The CHPD model of the CHP system is established. The CHPD model includes the objective function and the constraints. The CHPD model is described in detail as follows.

(1-1) The objective function of the CHPD model

The objective function of the CHPD model aims to minimize a total generation cost of the CHP units, the non-CHP thermal units, the wind farms and the heating boilers. The total generation cost is established by a formula of $$\sum_{t \in T} \left( \sum_{i \in I^{CHP}} C_{i,t}^{CHP} + \sum_{i \in I^{TU}} C_{i,t}^{TU} + \sum_{i \in I^{WD}} C_{i,t}^{WD} + \sum_{i \in I^{HB}} C_{i,t}^{HB} \right)$$

where, t represents a dispatch time period, T represents an index set of dispatch time periods, $I^{CHP}$ represents an index set of the CHP units, $I^{TU}$ represents an index set of the non-CHP thermal units, $I^{WD}$ represents an index set of the wind farms, $I^{HB}$ represents an index set of the heating boilers, $C_{i,t}^{CHP}$ represents a generation cost function of CHP unit i during period t, $C_{i,t}^{TU}$ represents a generation cost function of non-CHP thermal unit i during the period t, $C_{i,t}^{WD}$ represents a generation cost function of wind farm i during the period t, and $C_{i,t}^{HB}$ represents a generation cost function of heating boiler i during the period t.

The generation cost function of the CHP unit i during the period t is established by a formula of $$C_{i,t}^{CHP}(p_{i,t}^{CHP}, q_{i,t}^{CHP}) = C_i^{CHP,0} + C_i^{CHP,p1} \cdot p_{i,t}^{CHP} + C_i^{CHP,q1} \cdot q_{i,t}^{CHP} + C_i^{CHP,p2} \cdot (p_{i,t}^{CHP})^2 + C_i^{CHP,q2} \cdot (q_{i,t}^{CHP})^2 + C_i^{CHP,pq2} \cdot p_{i,t}^{CHP} q_{i,t}^{CHP}, \forall i \in I^{CHP}, \forall t \in T$$

where, $C_i^{CHP,0}$, $C_i^{CHP,p1}$, $C_i^{CHP,q1}$, $C_i^{CHP,p2}$, $C_i^{CHP,q2}$ and $C_i^{CHP,pq2}$ represent generation cost coefficients of the CHP unit i, $p_{i,t}^{CHP}$ represents a power output of the CHP unit i during the period t, and $q_{i,t}^{CHP}$ represents a heat output of the CHP unit i during the period t. The generation cost coefficients are characteristic parameters of the CHP unit.

The generation cost function of the non-CHP thermal unit i during the period t is established by a formula of $$C_{i,t}^{TU}(p_{i,t}^{TU}) = C_i^{TU,0} + C_i^{TU,p1} p_{i,t}^{TU} + C_i^{TU,p2} \cdot (p_{i,t}^{TU})^2, \forall i \in I^{TU}, \forall t \in T$$

where, $C_i^{TU,0}$, $C_i^{TU,p1}$ and $C_i^{TU,p2}$ represent generation cost coefficients of the non-CHP thermal unit i, and $p_{i,t}^{TU}$ represents a power output of the non-CHP thermal unit i during the period t. Similarly, the generation cost coefficients are characteristic parameters of the non-CHP thermal unit.

The generation cost function of the wind farm i during the period t is established by a formula of $$C_{i,t}^{WD}(p_{i,t}^{WD}) = C_i^{WD,pty}(\overline{P_{i,t}^{WD}} - p_{i,t}^{WD})^2, \forall i \in I^{WD}, \forall t \in T$$

where, $C_i^{WD,pty}$ represents a penalty coefficient, $\overline{P_{i,t}^{WD}}$ represents an available power output of the wind farm i during the period t and $p_{i,t}^{WD}$ represents a power output of the wind farm i during the period t. A value of the penalty coefficient is determined according to consumption demands of wind power, which is adjusted by a power system dispatching center according to a dispatch feedback result.

The generation cost function of the heating boiler i during the period t is established by a formula of $$C_{i,t}^{HB}(q_{i,t}^{HB}) = C_i^{HB} \cdot q_{i,t}^{HB}, \forall i \in I^{HB}, \forall t \in T$$

where, $C_i^{HB}$ represents a generation cost coefficient of the heating boiler i, which is a characteristic parameter of the heating boiler i, and $q_{i,t}^{HB}$ represents a heat output of the wind farm i during the period t.

(1-2) The constraints of the CHPD model

The constraints of the CHPD model include constraints of the EPS and constraints of the CHS.

The constraints of the EPS include operation constraints of the CHP units, ramping up and down constraints of the CHP units, operation constraints of the non-CHP thermal units, ramping up and down constraints of the non-CHP thermal units, spinning reserve constraints of the non-CHP thermal units, operation constraints of the wind farms, a power balance constraint of the EPS, a line flow limit constraint of the EPS, and a spinning reserve constraint of the EPS.

The constraints of the CHS include: constraints between supply/return water temperature differences of nodes and heat outputs, heat output constraints of the heating boilers, supply water temperature constraints at nodes with heat sources connected, constraints between supply/return water temperature differences of nodes and heat exchanges of heat exchange stations, return water temperature constraints of heat exchange stations, and operation constraints of heating networks of the CHS.

(1-2-1) The constraints of the EPS.

The operation constraints of the CHP units are denoted by a formula of $$P_{i,t}^{CHP} = \sum_{\gamma \in NE_i} \alpha_{i,t}^{\gamma} P_i^{\gamma}, q_{i,t}^{CHP} = \sum_{\gamma \in NE_i} \alpha_{i,t}^{\gamma} Q_i^{\gamma},$$

$$0 \leq \alpha_{i,t}^{\gamma} \leq 1, \sum_{\gamma \in NE_i} \alpha_{i,t}^{\gamma} = 1, \forall i \in I^{CHP}, \forall t \in T$$

where, $NE_i$ represents an index set of extreme points of the CHP unit i, $P_i^{\gamma}$, $Q_i^{\gamma}$ represent respectively a power output at extreme point $\gamma$ of the CHP unit i and a heat output at the extreme point $\gamma$ of the CHP unit i, and $\alpha_{i,t}^{\gamma}$ represents a convex combination coefficient of the extreme point $\gamma$ of the CHP unit i during the period t. The extreme points refer to points formed by heat output limits and power output limits of the CHP units.

The ramping up and down constraints of the CHP units are denoted by a formula of $$-RD_i^{CHP} \cdot \Delta T \leq p_{i,t+1}^{CHP} - p_{i,t}^{CHP} \leq RU_i^{CHP} \cdot \Delta T, \forall i \in I^{CHP}, \forall t \in T$$

where, $RU_i^{CHP}$ represents an upward ramp rate of the CHP unit i, $RD_i^{CHP}$ represents a downward ramp rate of the CHP unit i, $p_{i,t+1}^{CHP}$ represents a power output of the CHP unit i during period t+1, and $\Delta T$ represents a dispatch interval.

The operation constraints of the non-CHP thermal units are denoted by a formula of $$\underline{P_i^{TU}} \leq p_{i,t}^{TU} \leq \overline{P_i^{TU}}, \forall i \in I^{TU}, \forall t \in T$$

where, $\overline{P_i^{TU}}$ represents an upper output bound of the non-CHP thermal unit i, and $\underline{P_i^{TU}}$ represents a lower output bound of the non-CHP thermal unit i.

The ramping up and down constraints of the non-CHP thermal units are denoted by a formula of $$-RD_i^{TU} \cdot \Delta T \leq p_{i,t+1}^{TU} - p_{i,t}^{TU} \leq RU_i^{TU} \cdot \Delta T, \forall i \in I^{TU}, \forall t \in T$$

where, $RU_i^{TU}$ represents an upward ramp rate of the non-CHP thermal unit i, $RD_i^{TU}$ represents a downward ramp rate of the non-CHP thermal unit i, and $p_{i,t+1}^{TU}$ represents a power output of the non-CHP thermal unit i during period t+1.

The spinning reserve constraints of the non-CHP thermal units are denoted by a formula of $$0 \leq ru_{i,t}^{TU} \leq RU_i^{TU}, ru_{i,t}^{TU} \leq \overline{P_i^{TU}} - p_{i,t}^{TU}, \forall i \in I^{TU}, \forall t \in T$$

$$0 \leq rd_{i,t}^{TU} \leq RD_i^{TU}, rd_{i,t}^{TU} \leq p_{i,t}^{TU} - \underline{P_i^{TU}}, \forall i \in I^{TU}, \forall t \in T$$

where, $ru_{i,t}^{TU}$ represents an upward spinning reserve contribution of the non-CHP thermal unit i during the period t, and $rd_{i,t}^{TU}$ represents a downward spinning reserve contribution of the non-CHP thermal unit i during the period t.

The operation constraints of the wind farms are denoted by a formula of $$0 \leq p_{i,t}^{WD} \leq \overline{P_i^{WD}}, \forall i \in I^{WD}, \forall t \in T$$

where, $p_{i,t}^{WD}$ represents a power output of the wind farm i during the period t, and $\overline{P_{i,t}^{WD}}$ represents an available power output of the wind farm i during the period t.

The power balance constraint of the EPS is denoted by a formula of $$\sum_{i \in I^{CHP}} p_{i,t}^{CHP} + \sum_{i \in I^{TU}} p_{i,t}^{TU} + \sum_{i \in I^{WD}} p_{i,t}^{WD} = \sum_{m \in I^{LD}} D_{m,t}, \forall t \in T$$

where, $I^{LD}$ represents an index set of loads in the EPS and $D_{m,t}$ represents a power demand of load m in the EPS during the period t.

The line flow limit constraint of the EPS is denoted by a formula of $$\left| \sum_{l \in I^{EPS}} SF_{j-1} \cdot \left( \sum_{i \in I_{EPS,l}^{CHP}} p_{i,t}^{CHP} + \sum_{i \in I_{EPS,l}^{TU}} p_{i,t}^{TU} + \sum_{i \in I_{EPS,l}^{WD}} p_{i,t}^{WD} - \sum_{m \in I_{EPS,l}^{LD}} D_{m,t} \right) \right| \leq L_j, \forall j \in I^{LN}, \forall t \in T$$

where, $I^{EPS}$ represents an index set of buses in the EPS, $SF_{j-1}$ represents a shift factor for bus l on line j of the EPS, $I_{EPS,l}^{CHP}$ represents an index set of CHP units connected to the bus l of the EPS, $I_{EPS,l}^{TU}$ represents an index set of non-CHP thermal units connected to the bus l of the EPS, $I_{EPS,l}^{WD}$ represents an index set of wind farms connected to the bus l of the EPS, $I_{EPS,l}^{LD}$ represents an index set of loads connected to the bus l of the EPS, $L_j$ represents a flow limit of the line j of the EPS, and $I^{LN}$ represents an index set of lines in the EPS.

The spinning reserve constraint of the EPS is denoted by a formula of $$\sum_{i \in I^{TU}} ru_{i,t}^{TU} \geq SRU_t, \sum_{i \in I^{TU}} rd_{i,t}^{TU} \geq SRD_t, \forall t \in T$$

where, $SRU_t$ represents an upward spinning reserve demand of the EPS during the period t and $SRD_t$ represents a downward spinning reserve demand of the EPS during the period t.

(1-2-2) The constraints of the CHS
(1-2-2-1) Heating constraints of heat sources of the CHP units and the heating boilers The constraints between the supply/return water temperature differences of the nodes and the heat outputs are denoted by a formula of $$\sum_{i \in I_{CHS,k}^{CHP}} q_{i,t}^{CHP} + \sum_{i \in I_{CHS,k}^{HB}} q_{i,t}^{HB} = C \cdot M_k^N \cdot (\tau_{k,t}^S - \tau_{k,t}^R), \forall k \in I_{HS}^{CHS}, \forall t \in T$$

where, $I_{CHS,k}^{CHP}$ represents an index set of CHP units connected to node k of the CHS, $I_{CHS,k}^{HB}$ represents an index set of heating boilers connected to the node k of the CHS, C represents a specific heat capacity of water, $M_k^N$ represents a total mass flow rate of water at the node k of the CHS, $\tau_{k,t}^S$ represents a water temperature of the node k in supply pipelines of the CHS during the period t, $\tau_{k,t}^R$ represents a water temperature of the node k in return pipelines of the CHS during the period t, and $I_{HS}^{CHS}$ represents an index set of nodes with heat sources connected in the CHS.

The heat output constraints of the heating boilers are denoted by a formula of $$0 \leq q_{i,t}^{HB} \leq \overline{Q_i^{HB}}, \forall i \in I^{HB}, \forall t \in T$$

where, $\overline{Q_i^{HB}}$ represents an upper heat output bound of the heating boiler i.

The supply water temperature constraints at the nodes with heat sources connected are denoted by a formula of $$\underline{T_k^S} \leq \tau_{k,t}^S \leq \overline{T_k^S}, \forall k \in I_{HS}^{CHS}, \forall t \in T$$

where, $\overline{T_k^S}$ represents an upper bound of the water temperature at the node k in the supply pipelines of the CHS and $\underline{T_k^S}$ represents a lower bound of the water temperature at the node k in the supply pipelines of the CHS.

(1-2-2-2) Operation constraints of the heat exchange stations

The constraints between the supply/return water temperature differences of the nodes and the heat exchanges of the heat exchange stations in the CHS are denoted by a formula of $$\sum_{n \in I_{CHS,k}^{HES}} Q_{n,t}^{HES} = C \cdot M_k^N \cdot (\tau_{k,t}^S - \tau_{k,t}^R), \forall k \in I_{HES}^{CHS}, \forall t \in T$$

where, $I_{CHS,k}^{HES}$ represents an index set of heat exchange stations connected to node k of the CHS, $Q_{n,t}^{HES}$ represents a heat exchange of heat exchange station n during the period t, C represents a specific heat capacity of water, $M_k^N$ represents a total mass flow rate of water at the node k of the CHS, and $I_{HES}^{CHS}$ represents an index set of nodes with heat exchange stations connected in the CHS.

The return water temperature constraints of the heat exchange stations are denoted by a formula of $$\underline{T_k^R} \leq \tau_{k,t}^R \leq \overline{T_k^R}, \forall k \in I_{HES}^{CHS}, \forall t \in T$$

where, $\overline{T_k^R}$ represents an upper bound of the water temperature at the node k in the return pipelines of the CHS and $\underline{T_k^R}$ represents a lower bound of the water temperature at the node k in the return pipelines of the CHS.

(1-2-2-3) Operation constraints of heating networks

The operation constraints of the heating networks of the CHS are denoted by a formula of $$\sum_{k2 \in I_{CHS,k1}^{CN,S}} \left( M_{k2 \to k1}^{B,S} HL_{k2 \to k1}^{S} \left( \tau_{k2 \to k1,t}^{S,temp} - T_t^{AMB} \right) \right) =$$

$$\left( \sum_{k2 \in I_{CHS,k1}^{CN,S}} M_{k2 \to k1}^{B,S} \right) (\tau_{k1,t}^{S} - T_t^{AMB}), \forall k1 \in I^{CHS}, \forall t \in T$$

$$\sum_{k2 \in I_{CHS,k1}^{CN,R}} \left( M_{k2 \to k1}^{B,R} HL_{k2 \to k1}^{R} \left( \tau_{k2 \to k1,t}^{R,temp} - T_t^{AMB} \right) \right) =$$

$$\left( \sum_{k2 \in I_{CHS,k1}^{CN,R}} M_{k2 \to k1}^{B,R} \right) (\tau_{k1,t}^{R} - T_t^{AMB}), \forall k1 \in I^{CHS}, \forall t \in T$$

where, $M_{k2 \to k1}^{B,S}$ represents a mass flow rate of water transferred from node k2 to node k1 in supply pipelines of the CHS, $M_{k2 \to k1}^{B,R}$ represents a mass flow rate of return water transferred from the node k2 to the node k1 in return pipelines of the CHS, $I_{CHS,k1}^{CN,S}$ represents an index set of child nodes of the node k1 in supply pipelines of the CHS, $I_{CHS,k1}^{CN,R}$ represents an index set of child nodes of the node k1 in return pipelines of the CHS, $T_t^{AMB}$ represents an ambient temperature during the period t, $HL_{k2 \to k1}^{S}$ represents a heat transfer factor of water transferred from the node k2 to the node k1 in supply pipelines of the CHS, $HL_{k2 \to k1}^{R}$ represents a heat transfer factor of water transferred from the node k2 to the node k1 in return pipelines of the CHS.

$HL_{k2 \to k1}^{S}$ and $HL_{k2 \to k1}^{R}$ are calculated by a formula of $$HL_{k2 \to k1}^{S} = \exp\left( -\frac{Y_{k2 \to k1}^{S} L_{k2 \to k1}^{S}}{CM_{k2 \to k1}^{B,S}} \right), \forall k2 \in I_{CHS,k1}^{CN,S}, \forall k1 \in I^{CHS}$$

$$HL_{k2 \to k1}^{R} = \exp\left( -\frac{Y_{k2 \to k1}^{R} L_{k2 \to k1}^{R}}{CM_{k2 \to k1}^{B,R}} \right), \forall k2 \in I_{CHS,k1}^{CN,R}, \forall k1 \in I^{CHS}$$

where, $Y_{k2 \to k1}^{S}$ represents a heat transfer coefficient per unit length of pipeline from the node k2 to the node k1 in the supply pipelines of the CHS, $Y_{k2 \to k1}^{R}$ represents a heat transfer coefficient per unit length of pipeline from the node k2 to the node k1 in the return pipelines of the CHS, $L_{k2 \to k1}^{S}$ represents a length of the supply pipeline from the node k2 to the node k1, $L_{k2 \to k1}^{R}$ represents a length of the return pipeline from the node k2 to the node k1.

$\tau_{k2 \to k1,t}^{S,temp}$ and $\tau_{k2 \to k1,t}^{R,temp}$ are intermediate variables representing temperature of the node k1 and only considering a transfer delay of water from its child node k2, wherein $\tau_{k2 \to k1,t}^{S,temp}$ and $\tau_{k2 \to k1,t}^{R,temp}$ are denoted by a formula of $$\tau_{k2 \to k1,t}^{S,temp} = (\lfloor \Phi_{k2 \to k1}^{S} \rfloor + 1 - \Phi_{k2 \to k1}^{S}) \tau_{k2,t-\lfloor \Phi_{k2 \to k1}^{S} \rfloor}^{S} + (\Phi_{k2 \to k1}^{S} - \lfloor \Phi_{k2 \to k1}^{S} \rfloor) \tau_{k2,t-\lfloor \Phi_{k2 \to k1}^{S} \rfloor - 1}^{S}, \forall k2 \in I_{CHS,k1}^{CN,S}, \forall k1 \in I^{CHS}, \forall t \in T$$

$$\tau_{k2 \to k1,t}^{R,temp} = (\lfloor \Phi_{k2 \to k1}^{R} \rfloor + 1 - \Phi_{k2 \to k1}^{R}) \tau_{k2,t-\lfloor \Phi_{k2 \to k1}^{R} \rfloor}^{R} + (\Phi_{k2 \to k1}^{R} - \lfloor \Phi_{k2 \to k1}^{R} \rfloor) \tau_{k2,t-\lfloor \Phi_{k2 \to k1}^{R} \rfloor - 1}^{R}, \forall k2 \in I_{CHS,k1}^{CN,R}, \forall k1 \in I^{CHS}, \forall t \in T$$

where, $\Phi_{k2 \to k1}^{S}$ represents transfer time periods of water from the node k2 to the node k1 in supply pipelines of the CHS, $\Phi_{k2 \to k1}^{R}$ represents transfer time periods of water from the node k2 to the node k1 in return pipelines of the CHS, and $\lfloor \cdot \rfloor$ represents a rounding down operator.

(2) The CHPD model established in (1) is transformed into a model in a matrix form.

In detail, the CHPD model is summarized as a following quadratic programming (QP) problem in the matrix form by a formula of:

$$\min_{x_E, x_H} C_E(x_E) + C_H(x_H)$$

$$\text{s.t. } A_E x_E \leq b_E$$

$$A_H x_H \leq b_H$$

$$D x_E + E x_H \leq f$$

where, $x_E$ represents variables of the EPS, and the variables of the EPS comprises $p_{i,t}^{TU}$, $ru_{i,t}^{TU}$, $rd_{i,t}^{TU}$, $p_{i,t}^{WD}$, $p_{i,t}^{CHP}$, $q_{i,t}^{CHP}$ and $\alpha_{i,t}^{\gamma}$; and $x_H$ represents variables of the CHS, and the variables of the CHS comprises $q_{i,t}^{HB}$, $\tau_{k,t}^{S}$ and $\tau_{k,t}^{R}$.

$C_E$ represents the objective function of the EPS and $C_H$ represents the objective function of the CHS. $C_E$ refers to $$\sum_{t \in T} \left( \sum_{i \in I^{CHP}} C_{i,t}^{CHP} + \sum_{i \in I^{TU}} C_{i,t}^{TU} + \sum_{i \in I^{WD}} C_{i,t}^{WD} \right)$$

and $C_H$ refers to $$\sum_{t \in T} \left( \sum_{i \in I^{HB}} C_{i,t}^{HB} \right).$$

$A_E x_E \leq b_E$ refers to the constraints of the EPS, which includes all constraints described in (1-2-1). Each row in $A_E$ and $b_E$ has one-to-one correspondence with each constraint in the EPS. Each column in $A_E$ and $b_E$ has one-to-one correspondence with each variable in the EPS. Each element in $A_E$ is a coefficient of a variable corresponding to a column where the element is located in a constraint corresponding to a row where the element is located. Elements in each row in $b_E$ are inequality constant terms in the constraint corresponding to the elements.

$A_H x_H \leq b_H$ refers to the constraints of the CHS except the constraints between the supply/return water temperature differences of the nodes and the heat outputs, which includes the constraints described in (1-2-2) except the constraints between the supply/return water temperature differences of the nodes and the heat outputs. Each row in $A_H$ and $b_H$ has one-to-one correspondence with each constraint in the CHS. Each column in $A_H$ and $b_H$ has one-to-one correspondence with each variable in the CHS. Each element in $A_H$ is a coefficient of a variable corresponding to a column where the element is located in a constraint corresponding to a row where the element is located. Elements in each row in $b_H$ are inequality constant terms in the constraint corresponding to the elements.

$D x_E + E x_H \leq f$ refers to the constraints between the supply/return water temperature differences of the nodes and the heat outputs described in (1-2-2), i.e. coupling constraints on the EPS and the CHS. Each row in D, E and f has one-to-one correspondence with each constraint in the coupling constraints on the EPS and the CHS. Each row in D has one-to-one correspondence with each variable in the EPS. Each row in E has one-to-one correspondence with each variable in the CHS. Each element in D and E is a coefficient of a variable corresponding to a column where the element is located in a constraint corresponding to a row where the element is located. Elements in each row in f are inequality constant terms in the constraint corresponding to the elements.

(3) The CHPD model in the matrix form described in (2) is solved by the Benders decomposition.

Figure 3:
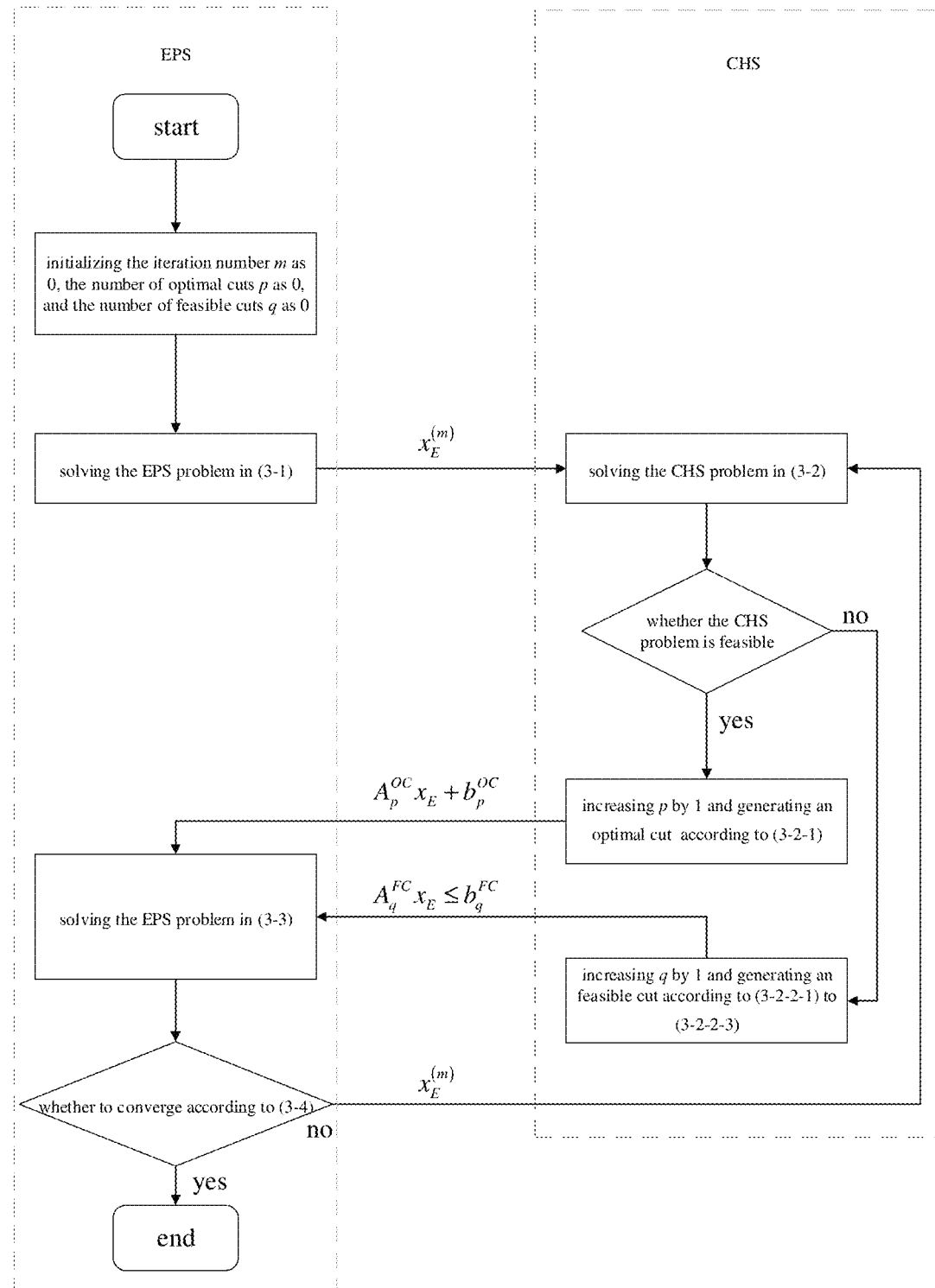
FIG. 3 is a flow chart of a method for solving a CHPD model according to another exemplary embodiment.

FIG. 3 is a flow chart of a method for solving a CHPD model according to another exemplary embodiment. As illustrated in FIG. 3, the method includes followings.

(3-1) Initializing: an iteration number m is initialized as 0, the number of optimal cuts p is initialized as 0 and the number of feasible cuts q is initialized as 0. Then an EPS problem is solved to obtain a solution as $x_E^{(m)}$ by a formula of $$\min_{x_E} C_E(x_E)$$
$$\text{s.t. } A_E x_E \leq b_E.$$

(3-2) A CHS problem is solved according to the solution $x_E^{(m)}$ by a formula of $$\min_{x_E, x_H} C_H(x_H)$$
$$\text{s.t. } A_H x_H \leq bn_H$$
$$Dx_E + Ex_H \leq f$$
$$x_E = x_E^{(m)}.$$

(3-2-1) If the CHS problem in (3-2) is feasible, p is increased by 1 and an optimal cut is generated as follows, $$A_p^{OC} x_E + b_p^{OC},$$

where, $A^{OC} = \lambda^T$, $b^{OC} = C_{H \leftarrow E}(x_E^{(m)}) - \lambda^T x_E^{(m)}$, and $\lambda$ represents a Lagrange multiplier of a constraint $x_E = x_E^{(m)}$ in (3-2), and $C_{H \leftarrow E}(x_E^{(m)})$ represents an objective value of the CHS problem in (3-2).

(3-2-2) If the CHS problem in (3-2) is infeasible, q is increased by 1 and an feasible cut is generated as follows, $$A_q^{FC} x_E \leq b_q^{FC}.$$

$A_q^{FC}$ and $b_q^{FC}$ are calculated according to following acts:

(3-2-2-1) denoting a feasibility problem of the CHS problem as a formula of:

$$\max_{x_H} 0^T x_H$$
$$\text{s.t. } A_H x_H \leq b_H$$
$$Dx_E^{(m)} + Ex_H \leq f;$$

(3-2-2-2) introducing a relaxation term ε to relax the feasibility problem of the CHS problem in (3-2-2-1) as a formula of:

$$\max_{x_H, \varepsilon} 1^T \varepsilon$$
$$\text{s.t. } A_H x_H \leq b_H$$
$$Dx_E^{(m)} + Ex_H + 1^T \varepsilon \leq f$$
$$\varepsilon \leq 0;$$

(3-2-2-3) denoting a Lagrange multiplier of a constraint $A_H x_H \leq b_H$ in the relaxed feasibility problem of the CHS problem (3-2-2-2) as $\hat{u}$ and a Lagrange multiplier of a constraint $Dx_E^{(m)} + Ex_H + 1^T \varepsilon \leq f$ in the relaxed feasibility problem (3-2-2-2) as $\hat{v}$; and calculating $A_q^{FC}$ and $b_q^{FC}$ according to a formula of:

$$A_q^{FC} = \hat{v}^T D, b_q^{FC} = \hat{u}^T b_H + \hat{v}^T f.$$

(3-3) The EPS problem is solved by a formula of $$\min_{x_E} C_E(x_E) + C_{H \leftarrow E}$$
$$\text{s.t. } A_E x_E \leq b_E$$
$$C_{H \leftarrow E} \geq 0$$
$$C_{H \leftarrow E} \geq A_i^{OC} x_E + b_i^{OC}, i = 1, 2, \ldots, p$$
$$A_i^{FC} x_E \leq b_i^{FC}, i = 1, 2, \ldots, q;$$

the iteration number m is increased by 1 and a solution is denoted as $x_E^{(m)}$.

(3-4) A convergence is checked. If $\|x_E^{(m)} - x_E^{(m-1)}\|_\infty < \Delta$, the iteration is terminated to obtain the dispatch parameters for the EPS and the CHS according to the solution, in which $\Delta$ is a convergence threshold, for example, a value of $\Delta$ is 0.001, and then (3-5) is executed; and if $\|x_E^{(m)} - x_E^{(m-1)}\|_\infty \geq \Delta$, (3-2) is returned.

(3-5) The obtained solution is used as the dispatch parameters for the EPS and the CHS.

Embodiments of the present disclosure further provide a dispatch apparatus for controlling a CHP system. The device includes: a processor; and a memory for storing instructions executable by the processor. The processor is configured to perform the above method.

Embodiments of the present disclosure further provide a non-transitory computer readable storage medium. The non-transitory computer readable storage medium according to embodiments of the present disclosure may include instructions that, when executed by a processor of an apparatus, causes the apparatus to execute the above method.

The technical solutions provided by embodiments of the present disclosure have following advantageous effects.

In the technical solutions of the present disclosure, the CHPD model can be established by combining the dispatch model of the EPS and the dispatch model of the CHS. An algorithm for solving the proposed CHPD model is provided based on Benders decomposition. In the provided algorithm for solving the proposed CHPD model, the operator of the EPS and the operator of the CHS can optimize corresponding internal systems independently, and the global optimal solution of the CHPD model can be obtained based on the interactive iteration between the boundary conditions of the EPS and CHS. The provided algorithm for solving the proposed CHPD model may have a good convergence rate and significantly improve an operation flexibility of the CHS.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A dispatch method for a combined heat and power CHP system, wherein, the CHP system comprises CHP units, non-CHP thermal units, wind farms and heating boilers; the CHP units, the non-CHP thermal units and the wind farms form an electric power system EPS of the CHP system; the CHP units and the heating boilers form a central heating system CHS of the CHP system; the EPS and the CHS are isolable; and the method comprises:

establishing a combined heat and power dispatch CHPD model of the CHP system, wherein an objective function of the CHPD model is a minimizing function of a total generation cost of the CHP units, the non-CHP thermal units, the wind farms and the heating boilers and constraints of the CHPD model are established based on generation cost of the CHP units, the non-CHP thermal units, the wind farms and the heating boilers, the constraints comprising constraints of the EPS and constraints of the CHS; the constraints of the EPS comprising: operation constraints of the CHP units, ramping up and down constraints of the CHP units, operation constraints of the non-CHP thermal units, ramping up and down constraints of the non-CHP thermal units, spinning reserve constraints of the non-CHP thermal units, operation constraints of the wind farms, a power balance constraint of the EPS, a line flow limit constraint of the EPS, and a spinning reserve constraint of the EPS; and the constraints of the CHS comprising: constraints between supply/return water temperature differences of nodes and heat outputs, heat output constraints of the heating boilers, supply water temperature constraints at nodes with heat sources connected, constraints between supply/return water temperature differences of nodes and heat exchanges of heat exchange stations, return water temperature constraints of heat exchange stations, and operation constraints of heating networks of the CHS;

solving the CHPD model based on Benders decomposition to obtain dispatch parameters for the EPS and the CHS; and controlling the EPS and the CHS according to the corresponding dispatch parameters respectively.

2. The method according to claim 1, wherein the total generation cost is established by a formula of $$\sum_{t\in T}\left(\sum_{i\in I^{CHP}} C_{i,t}^{CHP} + \sum_{i\in I^{TU}} C_{i,t}^{TU} + \sum_{i\in I^{WD}} C_{i,t}^{WD} + \sum_{i\in I^{HB}} C_{i,t}^{HB}\right)$$

where, t represents a dispatch time period, T represents an index set of dispatch time periods, $I^{CHP}$ represents an index set of the CHP units, $I^{TU}$ represents an index set of the non-CHP thermal units, $I^{WD}$ represents an index set of the wind farms, $I^{HB}$ represents an index set of the heating boilers, $C_{i,t}^{CHP}$ represents a generation cost function of CHP unit i during period t, $C_{i,t}^{TU}$ represents a generation cost function of non-CHP thermal unit i during the period t, $C_{i,t}^{WD}$ represents a generation cost function of wind farm i during the period t, and $C_{i,t}^{HB}$ represents a generation cost function of heating boiler i during the period t.

3. The method according to claim 2, wherein the generation cost function of the CHP unit i during the period t is established by a formula of $$C_{i,t}^{CHP}(p_{i,t}^{CHP},q_{i,t}^{CHP})=C_i^{CHP,0}+C_i^{CHP,p1}\cdot p_{i,t}^{CHP}+C_i^{CHP,q1}\cdot q_{i,t}^{CHP}+C_i^{CHP,p2}\cdot(p_{i,t}^{CHP})^2+C_i^{CHP,q2}\cdot(q_{i,t}^{CHP})^2+C_i^{CHP,pq2}\cdot p_{i,t}^{CHP}q_{i,t}^{CHP}, \forall i\in I^{CHP}, \forall t\in T$$

where, $C_i^{CHP,0}$, $C_i^{CHP,p1}$, $C_i^{CHP,q1}$, $C_i^{CHP,p2}$, $C_i^{CHP,q2}$ and $C_i^{CHP,pq2}$ represent generation cost coefficients of the CHP unit i, $p_{i,t}^{CHP}$ represents a power output of the CHP unit i during the period t, and $q_{i,t}^{CHP}$ represents a heat output of the CHP unit i during the period t.

4. The method according to claim 2, wherein the generation cost function of the non-CHP thermal unit i during the period t is established by a formula of $$C_{i,t}^{TU}(p_{i,t}^{TU})=C_i^{TU,0}+C_i^{TU,p1}p_{i,t}^{TU}+C_i^{TU,p2}\cdot(p_{i,t}^{TU})^2, \forall i\in I^{TU}, \forall t\in T$$

where, $C_i^{TU,0}$, $C_i^{TU,p1}$ and $C_i^{TU,p2}$ represent generation cost coefficients of the non-CHP thermal unit i, and $p_{i,t}^{TU}$ represents a power output of the non-CHP thermal unit i during the period t.

5. The method according to claim 2, wherein the generation cost function of the wind farm i during the period t is established by a formula of $$C_{i,t}^{WD}(p_{i,t}^{WD})=C_i^{WD,pty}(\overline{P_{i,t}^{WD}}-p_{i,t}^{WD})^2, \forall i\in I^{WD}, \forall t\in T$$

where, $C_i^{WD,pty}$ represents a penalty coefficient, $\overline{P_{i,t}^{WD}}$ represents an available power output of the wind farm i during the period t and $p_{i,t}^{WD}$ represents a power output of the wind farm i during the period t.

6. The method according to claim 2, wherein the generation cost function of the heating boiler i during the period t is established by a formula of $$C_{i,t}^{HB}(q_{i,t}^{HB})=C_i^{HB}\cdot q_{i,t}^{HB}, \forall i\in I^{HB}, \forall t\in T$$

where, $C_i^{HB}$ represents a generation cost coefficient of the heating boiler i, and $q_{i,t}^{HB}$ represents a heat output of the wind farm i during the period t.

7. The method according to claim 1, wherein the operation constraints of the CHP units are denoted by a formula of $$p_{i,t}^{CHP} = \sum_{\gamma\in NE_i} \alpha_{i,t}^{\gamma} P_i^{\gamma}, \quad q_{i,t}^{CHP} = \sum_{\gamma\in NE_i} \alpha_{i,t}^{\gamma} Q_i^{\gamma},$$

$$0 \le \alpha_{i,t}^{\gamma} \le 1, \sum_{\gamma\in NE_i} \alpha_{i,t}^{\gamma} = 1, \forall i \in I^{CHP}, \forall t \in T$$

where, $p_{i,t}^{CHP}$ represents a power output of the CHP unit i during the period t, $q_{i,t}^{CHP}$ represents a heat output of the CHP unit i during the period t, $NE_i$ represents an index set of extreme points of the CHP unit i, $P_i^{\gamma}$, $Q_i^{\gamma}$ represent respectively a power output at extreme point γ of the CHP unit i and a heat output at the extreme point γ of the CHP unit i, and $\alpha_{i,t}^{\gamma}$ represents a convex combination coefficient of the extreme point γ of the CHP unit i during the period t; and the ramping up and down constraints of the CHP units are denoted by a formula of $$-RD_i^{CHP}\cdot\Delta T \le p_{i,t+1}^{CHP}-p_{i,t}^{CHP} \le RU_i^{CHP}\cdot\Delta T, \forall i\in I^{CHP}, \forall t\in T$$

where, $RU_i^{CHP}$ represents an upward ramp rate of the CHP unit i, $RD_i^{CHP}$ represents a downward ramp rate of the CHP unit i, $p_{i,t+1}^{CHP}$ represents a power output of the CHP unit i during period t+1, and $\Delta T$ represents a dispatch interval.

8. The method according to claim 1, wherein the operation constraints of the non-CHP thermal units are denoted by a formula of $$\underline{P_i^{TU}} \le p_{i,t}^{TU} \le \overline{P_i^{TU}}, \forall i\in I^{TU}, \forall t\in T$$

where, $\overline{P_i^{TU}}$ represents an upper output bound of the non-CHP thermal unit i, $\underline{P_i^{TU}}$ represents a lower output bound of the non-CHP thermal unit i and $p_{i,t}^{TU}$ represents a power output of the non-CHP thermal unit i during the period t;

the ramping up and down constraints of the non-CHP thermal units are denoted by a formula of $$-RD_i^{TU}\cdot\Delta T \le p_{i,t+1}^{TU}-p_{i,t}^{TU} \le RU_i^{TU}\cdot\Delta T, \forall i\in I^{TU}, \forall t\in T$$

where, $RU_i^{TU}$ represents an upward ramp rate of the non-CHP thermal unit i, $RD_i^{TU}$ represents a downward ramp rate of the non-CHP thermal unit, $p_{i,t+1}^{TU}$ represents a power output of the non-CHP thermal unit i during period t+1, and $\Delta T$ represents a dispatch interval; and the spinning reserve constraints of the non-CHP thermal units are denoted by a formula of $$0 \le ru_{i,t}^{TU} \le RU_i^{TU}, ru_{i,t}^{TU} \le \overline{P_i^{TU}}-p_{i,t}^{TU}, \forall i\in I^{TU}, \forall t\in T$$

$$0 \le rd_{i,t}^{TU} \le RD_i^{TU}, rd_{i,t}^{TU} \le p_{i,t}^{TU}-\underline{P_i^{TU}}, \forall i\in I^{TU}, \forall t\in T$$

where, $ru_{i,t}^{TU}$ represents an upward spinning reserve contribution of the non-CHP thermal unit i during the period t, and $rd_{i,t}^{TU}$ represents a downward spinning reserve contribution of the non-CHP thermal unit i during the period t.

9. The method according to claim 1, wherein the operation constraints of the wind farms are denoted by a formula of $$0 \le p_{i,t}^{WD} \le \overline{P_i^{WD}}, \forall i\in I^{WD}, \forall t\in T$$

where, $p_{i,t}^{WD}$ represents a power output of the wind farm i during the period t, and $\overline{P_{i,t}^{WD}}$ represents an available power output of the wind farm i during the period t.

10. The method according to claim 1, wherein the power balance constraint of the EPS is denoted by a formula of $$\sum_{i\in I^{CHP}} p_{i,t}^{CHP} + \sum_{i\in I^{TU}} p_{i,t}^{TU} + \sum_{i\in I^{WD}} p_{i,t}^{WD} = \sum_{m\in I^{LD}} D_{m,t}, \forall t \in T$$

where, $p_{i,t}^{CHP}$ represents a power output of the CHP unit i during the period t, $p_{i,t}^{TU}$ represents a power output of the non-CHP thermal unit i during the period t, $p_{i,t}^{WD}$ represents a power output of the wind farm i during the period t, $I^{LD}$ represents an index set of loads in the EPS and $D_{m,t}$ represents a power demand of load m in the EPS during the period t;

the line flow limit constraint of the EPS is denoted by a formula of $$\left| \sum_{l \in I^{EPS}} SF_{j-l} \cdot \left( \sum_{i \in I_{EPS,l}^{CHP}} p_{i,t}^{CHP} + \sum_{i \in I_{EPS,l}^{TU}} p_{i,t}^{TU} + \sum_{i \in I_{EPS,l}^{WD}} p_{i,t}^{WD} - \sum_{m \in I_{EPS,l}^{LD}} D_{m,t} \right) \right| \leq $$
$$L_j, \forall j \in I^{LN}, \forall t \in T$$

where, $I^{EPS}$ represents an index set of buses in the EPS, $SF_{j-l}$ represents a shift factor for bus l on line j of the EPS, $I_{EPS,l}^{CHP}$ represents an index set of CHP units connected to the bus l of the EPS, $I_{EPS,l}^{TU}$ represents an index set of non-CHP thermal units connected to the bus l of the EPS, $I_{EPS,l}^{WD}$ represents an index set of wind farms connected to the bus l of the EPS, $I_{EPS,l}^{LD}$ represents an index set of loads connected to the bus l of the EPS, $L_j$ represents a flow limit of the line j of the EPS, and $I^{LN}$ represents an index set of lines in the EPS; and the spinning reserve constraint of the EPS is denoted by a formula of $$\sum_{i \in I^{TU}} ru_{i,t}^{TU} \geq SRU_t, \sum_{i \in I^{TU}} rd_{i,t}^{TU} \geq SRD_t, \forall t \in T$$

where, $ru_{i,t}^{TU}$ represents an upward spinning reserve contribution of the non-CHP thermal unit i during the period t, $rd_{i,t}^{TU}$ represents a downward spinning reserve contribution of the non-CHP thermal unit i during the period t, $SRU_t$ represents an upward spinning reserve demand of the EPS during the period t and $SRD_t$ represents a downward spinning reserve demand of the EPS during the period t.

11. The method according to claim 1, wherein the constraints between the supply/return water temperature differences of the nodes and the heat outputs are denoted by a formula of $$\sum_{i \in I_{CHS,k}^{CHP}} q_{i,t}^{CHP} + \sum_{i \in I_{CHS,k}^{HB}} q_{i,t}^{HB} = C \cdot M_k^N \cdot (\tau_{k,t}^S - \tau_{k,t}^R), \forall k \in I_{HS}^{CHS},$$
$$\forall t \in T$$

where, $I_{CHS,k}^{CHP}$ represents an index set of CHP units connected to node k of the CHS, $I_{CHS,k}^{HB}$ represents an index set of heating boilers connected to the node k of the CHS, $q_{i,t}^{CHP}$ represents a heat output of the CHP unit i during the period t, $q_{i,t}^{HB}$ represents a heat output of the heating boiler i during the period t, C represents a specific heat capacity of water, $M_k^N$ represents a total mass flow rate of water at the node k of the CHS, $\tau_{k,t}^S$ represents a water temperature of the node k in supply pipelines of the CHS during the period t, $\tau_{k,t}^R$ represents a water temperature of the node k in return pipelines of the CHS during the period t, and $I_{HS}^{CHS}$ represents an index set of nodes with heat sources connected in the CHS;

the heat output constraints of the heating boilers are denoted by a formula of $$0 \leq q_{i,t}^{HB} \leq \overline{Q}_i^{HB}, \forall i \in I^{HB}, \forall t \in T$$

where, $\overline{Q}_i^{HB}$ represents an upper heat output bound of the heating boiler i; and the supply water temperature constraints at the nodes with heat sources connected are denoted by a formula of $$\underline{T}_k^S \leq \tau_{k,t}^S \leq \overline{T}_k^S, \forall k \in I_{HS}^{CHS}, \forall t \in T$$

where, $\overline{T}_k^S$ represents an upper bound of the water temperature at the node k in the supply pipelines of the CHS and $\underline{T}_k^S$ represents a lower bound of the water temperature at the node k in the supply pipelines of the CHS.

12. The method according to claim 1, wherein the constraints between the supply/return water temperature differences of the nodes and the heat exchanges of the heat exchange stations in the CHS are denoted by a formula of $$\sum_{n \in I_{CHS,k}^{HES}} Q_{n,t}^{HES} = C \cdot M_k^N \cdot (\tau_{k,t}^S - \tau_{k,t}^R), \forall k \in I_{HES}^{CHS}, \forall t \in T$$

where, $I_{CHS,k}^{HES}$ represents an index set of heat exchange stations connected to node k of the CHS, $Q_{n,t}^{HES}$ represents a heat exchange of heat exchange station n during the period t, C represents a specific heat capacity of water, $M_k^N$ represents a total mass flow rate of water at the node k of the CHS, $\tau_{k,t}^S$ represents a water temperature of the node k in supply pipelines of the CHS during the period t, $\tau_{k,t}^R$ represents a water temperature of the node k in return pipelines of the CHS during the period t, and $I_{HES}^{CHS}$ represents an index set of nodes with heat exchange stations connected in the CHS; and the return water temperature constraints of the heat exchange stations are denoted by a formula of $$\underline{T}_k^R \leq \tau_{k,t}^R \leq \overline{T}_k^R, \forall k \in I_{HES}^{CHS}, \forall t \in T$$

where, $\overline{T}_k^R$ represents an upper bound of the water temperature at the node k in the return pipelines of the CHS and $\underline{T}_k^R$ represents a lower bound of the water temperature at the node k in the return pipelines of the CHS.

13. The method according to claim 1, wherein the operation constraints of the heating networks of the CHS are denoted by a formula of $$\sum_{k2 \in I_{CHS,k1}^{CN,S}} (M_{k2 \to k1}^{B,S} HL_{k2 \to k1}^S (\tau_{k2 \to k1,t}^{S,temp} - T_t^{AMB})) = $$
$$\left( \sum_{k2 \in I_{CHS,k1}^{CN,S}} M_{k2 \to k1}^{B,S} \right) (\tau_{k1,t}^S - T_t^{AMB}), \forall k1 \in I^{CHS}, \forall t \in T$$

$$\sum_{k2 \in I_{CHS,k1}^{CN,R}} (M_{k2 \to k1}^{B,R} HL_{k2 \to k1}^R (\tau_{k2 \to k1,t}^{R,temp} - T_t^{AMB})) = $$
$$\left( \sum_{k2 \in I_{CHS,k1}^{CN,R}} M_{k2 \to k1}^{B,R} \right) (\tau_{k1,t}^R - T_t^{AMB}), \forall k1 \in I^{CHS}, \forall t \in T$$

where, $M_{k2 \to k1}^{B,S}$ represents a mass flow rate of water transferred from node k2 to node k1 in supply pipelines of the CHS, $M_{k2 \to k1}^{B,R}$ represents a mass flow rate of return water transferred from the node k2 to the node k1 in return pipelines of the CHS, $I_{CHS,k1}^{CN,S}$ represents an index set of child nodes of the node k1 in supply pipelines of the CHS, $I_{CHS,k1}^{CN,R}$ represents an index set of child nodes of the node k1 in return pipelines of the CHS, $T_t^{AMB}$ represents an ambient temperature during the period t, $HL_{k2 \to k1}^S$ represents a heat transfer factor of water transferred from the node k2 to the node k1 in supply pipelines of the CHS, $HL_{k2 \to k1}^R$ represents a heat transfer factor of water transferred from the node k2 to the node k1 in return pipelines of the CHS, wherein $HL_{k2 \to k1}^S$ and $HL_{k2 \to k1}^R$ are calculated by a formula of $$HL_{k2 \to k1}^{S} = \exp\left(-\frac{Y_{k2 \to k1}^{S} L_{k2 \to k1}^{S}}{CM_{k2 \to k1}^{B,S}}\right), \forall k2 \in I_{CHS,k1}^{CN,S}, \forall k1 \in I^{CHS}$$

$$HL_{k2 \to k1}^{R} = \exp\left(-\frac{Y_{k2 \to k1}^{R} L_{k2 \to k1}^{R}}{CM_{k2 \to k1}^{B,R}}\right), \forall k2 \in I_{CHS,k1}^{CN,R}, \forall k1 \in I^{CHS}$$

where, $Y_{k2 \to k1}^{S}$ represents a heat transfer coefficient per unit length of pipeline from the node k2 to the node k1 in the supply pipelines of the CHS, $Y_{k2 \to k1}^{R}$ represents a heat transfer coefficient per unit length of pipeline from the node k2 to the node k1 in the return pipelines of the CHS, $L_{k2 \to k1}^{S}$ represents a length of the supply pipeline from the node k2 to the node k1, $L_{k2 \to k1}^{R}$ represents a length of the return pipeline from the node k2 to the node k1;

$\tau_{k2 \to k1,t}^{S,temp}$ and $\tau_{k2 \to k1,t}^{R,temp}$ are intermediate variables representing temperature of the node k1 and only considering a transfer delay of water from its child node k2, wherein $\tau_{k2 \to k1,t}^{S,temp}$ and $\tau_{k2 \to k1,t}^{R,temp}$ are denoted by a formula of $$\tau_{k2 \to k1,t}^{S,temp} = (\lfloor \Phi_{k2 \to k1}^{S} \rfloor + 1 - \Phi_{k2 \to k1}^{S})\tau_{k2,t-\lfloor \Phi_{k2 \to k1}^{S} \rfloor}^{S} +$$
$$(\Phi_{k2 \to k1}^{S} - \lfloor \Phi_{k2 \to k1}^{S} \rfloor)\tau_{k2,t-\lfloor \Phi_{k2 \to k1}^{S} \rfloor - 1}^{S},$$

$\forall k2 \in I_{CHS,k1}^{CN,S}, \forall k1 \in I^{CHS}, \forall t \in T$ $$\tau_{k2 \to k1,t}^{R,temp} = (\lfloor \Phi_{k2 \to k1}^{R} \rfloor + 1 - \Phi_{k2 \to k1}^{R})\tau_{k2,t-\lfloor \Phi_{k2 \to k1}^{R} \rfloor}^{R} +$$
$$(\Phi_{k2 \to k1}^{R} - \lfloor \Phi_{k2 \to k1}^{R} \rfloor)\tau_{k2,t-\lfloor \Phi_{k2 \to k1}^{R} \rfloor - 1}^{R},$$

$\forall k2 \in I_{CHS,k1}^{CN,R}, \forall k1 \in I^{CHS}, \forall t \in T$ where, $\Phi_{k2 \to k1}^{S}$ represents transfer time periods of water from the node k2 to the node k1 in supply pipelines of the CHS, $\Phi_{k2 \to k1}^{R}$ represents transfer time periods of water from the node k2 to the node k1 in return pipelines of the CHS, and $\lfloor \bullet \rfloor$ represents a rounding down operator.

14. The method according to claim 1, wherein the CHPD model is summarized as a following quadratic programming QP problem by a formula of:

$$\min_{x_E, x_H} C_E(x_E) + C_H(x_H)$$

s.t. $A_E x_E \leq b_E$ $A_H x_H \leq b_H$ $D x_E + E x_H \leq f$ where, $x_E$ represents variables of the EPS, and the variables of the EPS comprises $p_{i,t}^{TU}$, $ru_{i,t}^{TU}$, $rd_{i,t}^{TU}$, $p_{i,t}^{WD}$, $p_{i,t}^{CHP}$, $q_{i,t}^{CHP}$ and $\alpha_{i,t}^{\gamma}$, in which $p_{i,t}^{TU}$ represents a power output of the non-CHP thermal unit i during the period t, $ru_{i,t}^{TU}$ represents an upward spinning reserve contribution of the non-CHP thermal unit i during the period t, $rd_{i,t}^{TU}$ represents a downward spinning reserve contribution of the non-CHP thermal unit i during the period t, $p_{i,t}^{WD}$ represents a power output of the wind farm i during the period t, $p_{i,t}^{CHP}$ represents a power output of the CHP unit i during the period t, $q_{i,t}^{CHP}$ represents a heat output of the CHP unit i during the period t and $\alpha_{i,t}^{\gamma}$ represents a coefficient of extreme point γ of the CHP unit i during the period t; $x_H$ represents variables of the CHS, and the variables of the CHS comprises $q_{i,t}^{HB}$, $\tau_{k,t}^{S}$ and $\tau_{k,t}^{R}$, in which $q_{i,t}^{HB}$ represents a heat output of the heating boiler i during the period t, $\tau_{k,t}^{S}$ represents a water temperature of the node k in supply pipelines of the CHS during the period t, and $\tau_{k,t}^{R}$ represents a water temperature of the node k in return pipelines of the CHS during the period t; $A_E x_E \leq b_E$ refers to the constraints of the EPS; $A_H x_H \leq b_H$ refers to the constraints of the CHS except the constraints between the supply/return water temperature differences of the nodes and the heat outputs; and $Dx_E + Ex_H \leq f$ refers to the constraints between the supply/return water temperature differences of the nodes and the heat outputs.

15. The method according to claim 14, wherein solving the CHPD model based on Benders decomposition to obtain dispatch parameters for the EPS and the CHS comprises:

splitting the QP problem into an EPS problem and a CHS problem;

initializing an iteration number m as 0, the number of optimal cuts p as 0, and the number of feasible cuts q as 0;

solving the EPS problem to obtain a solution as $x_E^{(m)}$ by a formula of $$\min_{x_E} C_E(x_E)$$

s.t. $A_E x_E \leq b_E$;

solving the CHS problem according to the solution $x_E^{(m)}$ by a formula of $$\min_{x_E, x_H} C_H(x_H)$$

s.t. $A_H x_H \leq b_H$ $D x_E + E x_H \leq f$ $x_E = x_E^{(m)}$ if the CHS problem is feasible, increasing p by 1 and generating an optimal cut of $$A_p^{OC} x_E + b_p^{OC};$$

if the CHS problem is infeasible, increasing q by 1 and generating an feasible cut of $$A_q^{FC} x_E \leq b_q^{FC};$$

solving the EPS problem by a formula of $$\min_{x_E} C_E(x_E) + C_{H \leftarrow E}$$

s.t. $A_E x_E \leq b_E$ $C_{H \leftarrow E} \geq 0$ $C_{H \leftarrow E} \geq A_i^{OC} x_E + b_i^{OC}, i = 1, 2, \ldots, p$ $A_i^{FC} x_E \leq b_i^{FC}, i = 1, 2, \ldots, q;$ increasing the iteration number m by 1 and denoting a solution as $x_E^{(m)}$;

if $\|x_E^{(m)} - x_E^{(m-1)}\|_\infty < \Delta$, terminating the iteration to obtain the dispatch parameters for the EPS and the CHS according to the solution; and if $\|x_E^{(m)} - x_E^{(m-1)}\|_\infty \geq \Delta$, returning to act of solving the CHS problem according to the solution $x_E^{(m)}$.

16. The method according to claim 15, wherein $A^{OC}=\lambda^T$, $b^{OC}=C_{H\leftarrow E}(x_E^{(m)})-\lambda^T x_E^{(m)}$, and $\lambda$ represents a Lagrange multiplier of a constraint $x_E=x_E^{(m)}$, and $C_{H\leftarrow E}(x_E^{(m)})$ represents an objective value of the CHS problem;
$A_q^{FC}$ and $b_q^{FC}$ are calculated according to following acts:
denoting a feasibility problem of the CHS problem as a formula of:

$$\max_{x_H} 0^T x_H$$
$$\text{s.t.} \ A_H x_H \leq b_H$$
$$Dx_E^{(m)} + Ex_H \leq f;$$

introducing a relaxation term $\varepsilon$ to relax the feasibility problem of the CHS problem as a formula of:

$$\max_{x_H,\varepsilon} 1^T \varepsilon$$
$$\text{s.t.} \ A_H x_H \leq b_H$$
$$Dx_E^{(m)} + Ex_H + 1^T \varepsilon \leq f$$
$$\varepsilon \leq 0;$$

denoting a Lagrange multiplier of a constraint $A_H x_H \leq b_H$ in the relaxed feasibility problem of the CHS problem as $\hat{u}$ and a Lagrange multiplier of a constraint $Dx_E^{(m)}+Ex_H+1^T\varepsilon \leq f$ in the relaxed feasibility problem of the CHS problem as $\hat{v}$; and calculating $A_q^{FC}$ and $b_q^{FC}$ according to a formula of:

$$A_q^{FC}=\hat{v}^T D, b_q^{FC}=\hat{u}^T b_H + \hat{v}^T f.$$

17. A dispatch apparatus for controlling a combined heat and power CHP system, wherein, the CHP system comprises CHP units, non-CHP thermal units, wind farms and heating boilers; the CHP units, the non-CHP thermal units and the wind farms form an electric power system EPS of the CHP system; the CHP units and the heating boilers form a central heating system CHS of the CHP system; the EPS and the CHS are isolable; and the device comprises:
a processor; and
a memory for storing instructions executable by the processor,
wherein the processor is configured to:
establish a combined heat and power dispatch CHPD model of the CHP system, wherein an objective function of the CHPD model is a minimizing function of a total generation cost of the CHP units, the non-CHP thermal units, the wind farms and the heating boilers and constraints of the CHPD model are established based on generation cost of the CHP units, the non-CHP thermal units, the wind farms and the heating boilers, the constraints comprising constraints of the EPS and constraints of the CHS; the constraints of the EPS comprising: operation constraints of the CHP units, ramping up and down constraints of the CHP units, operation constraints of the non-CHP thermal units, ramping up and down constraints of the non-CHP thermal units, spinning reserve constraints of the non-CHP thermal units, operation constraints of the wind farms, a power balance constraint of the EPS, a line flow limit constraint of the EPS, and a spinning reserve constraint of the EPS; and the constraints of the CHS comprising: constraints between supply/return water temperature differences of nodes and heat outputs, heat output constraints of the heating boilers, supply water temperature constraints at nodes with heat sources connected, constraints between supply/return water temperature differences of nodes and heat exchanges of heat exchange stations, return water temperature constraints of heat exchange stations, and operation constraints of heating networks of the CHS;
solve the CHPD model based on Benders decomposition to obtain dispatch parameters for the EPS and the CHS; and
control the EPS and the CHS according to the corresponding dispatch parameters respectively.

18. A non-transitory computer-readable storage medium having stored therein instructions that, when executed by a processor of a computer, causes the computer to perform a dispatch method for a combined heat and power CHP system, wherein the CHP system comprises CHP units, non-CHP thermal units, wind farms and heating boilers; the CHP units, the non-CHP thermal units and the wind farms form an electric power system EPS of the CHP system; the CHP units and the heating boilers form a central heating system CHS of the CHP system; the EPS and the CHS are isolable; and the method comprises:
establishing a combined heat and power dispatch CHPD model of the CHP system, wherein an objective function of the CHPD model is a minimizing function of a total generation cost of the CHP units, the non-CHP thermal units, the wind farms and the heating boilers and constraints of the CHPD model are established based on generation cost of the CHP units, the non-CHP thermal units, the wind farms and the heating boilers, the constraints comprising constraints of the EPS and constraints of the CHS; the constraints of the EPS comprising: operation constraints of the CHP units, ramping up and down constraints of the CHP units, operation constraints of the non-CHP thermal units, ramping up and down constraints of the non-CHP thermal units, spinning reserve constraints of the non-CHP thermal units, operation constraints of the wind farms, a power balance constraint of the EPS, a line flow limit constraint of the EPS, and a spinning reserve constraint of the EPS; and the constraints of the CHS comprising: constraints between supply/return water temperature differences of nodes and heat outputs, heat output constraints of the heating boilers, supply water temperature constraints at nodes with heat sources connected, constraints between supply/return water temperature differences of nodes and heat exchanges of heat exchange stations, return water temperature constraints of heat exchange stations, and operation constraints of heating networks of the CHS;
solving the CHPD model based on Benders decomposition to obtain dispatch parameters for the EPS and the CHS; and
controlling the EPS and the CHS according to the corresponding dispatch parameters respectively.

\* \* \* \* \*